(12) United States Patent
Matarese et al.

(10) Patent No.: US 10,846,737 B1
(45) Date of Patent: Nov. 24, 2020

(54) MULTI-PLATFORM FREQUENCY CAPPING IN DISTRIBUTED AD SERVER ENVIRONMENT

(71) Applicant: BlackArrow, San Jose, CA (US)

(72) Inventors: Joseph R Matarese, Oakland, CA (US); Leslie M Carter, San Jose, CA (US)

(73) Assignee: BlackArrow, San Jose, CA (US)

( * ) Notice: Subject to any disclaimer, the term of this patent is extended or adjusted under 35 U.S.C. 154(b) by 866 days.

(21) Appl. No.: 14/299,355

(22) Filed: Jun. 9, 2014

(51) Int. Cl.
*G06Q 30/02* (2012.01)

(52) U.S. Cl.
CPC ................ *G06Q 30/0246* (2013.01)

(58) Field of Classification Search
CPC ............... G06Q 30/0257; G06Q 30/02; G06Q 30/0244; G06Q 30/0246; G06Q 30/0264; G06Q 30/0273; G06Q 30/0241; G06Q 30/0277; G06Q 10/087; G06Q 10/04; G06Q 30/0269; G06Q 30/0251; G06Q 30/0253; G06Q 30/0202; H04N 21/24
USPC .......................................... 725/14; 705/14.45
See application file for complete search history.

(56) References Cited

U.S. PATENT DOCUMENTS

| | | | | |
|---|---|---|---|---|
| 2009/0132368 | A1* | 5/2009 | Cotter | G06Q 30/02 705/14.55 |
| 2010/0318418 | A1* | 12/2010 | Wertheimer | G06Q 30/02 705/14.45 |
| 2011/0270674 | A1* | 11/2011 | Cosman | G06Q 10/087 705/14.45 |
| 2013/0179913 | A1* | 7/2013 | Haberman | H04N 21/24 725/14 |
| 2013/0282478 | A1* | 10/2013 | Mattern | G06Q 30/02 705/14.42 |
| 2014/0278973 | A1* | 9/2014 | Lowe | G06Q 30/0255 705/14.53 |
| 2015/0142557 | A1* | 5/2015 | Krishnamurthy | G06Q 30/0241 705/14.45 |

* cited by examiner

*Primary Examiner* — Saba Dagnew
(74) *Attorney, Agent, or Firm* — RowanTELS LLC

(57) ABSTRACT

A system includes a subscriber information service (SIS), logic defining a digital advertising campaign, and logic to operate the SIS to maintain an impression-to-decision ratio for one or more aspects of the advertising campaign and to apply the ratio to frequency capping the one or more aspects of the advertising campaign.

16 Claims, 8 Drawing Sheets

MULTI-PLATFORM FREQUENCY CAPPING IN DISTRIBUTED AD SERVER ENVIRONMENT

BACKGROUND

Prior techniques set a cookie in the user's browser to control ad exposure, or isolate the capping decision in each ad server (e.g., DoubleClip). Online frequency capping today is done based on prior impressions, which can be recorded as events in the network. Ad decisions are made before the media is viewed, impressions recorded after.

DESCRIPTION

Overview

Figure 1:
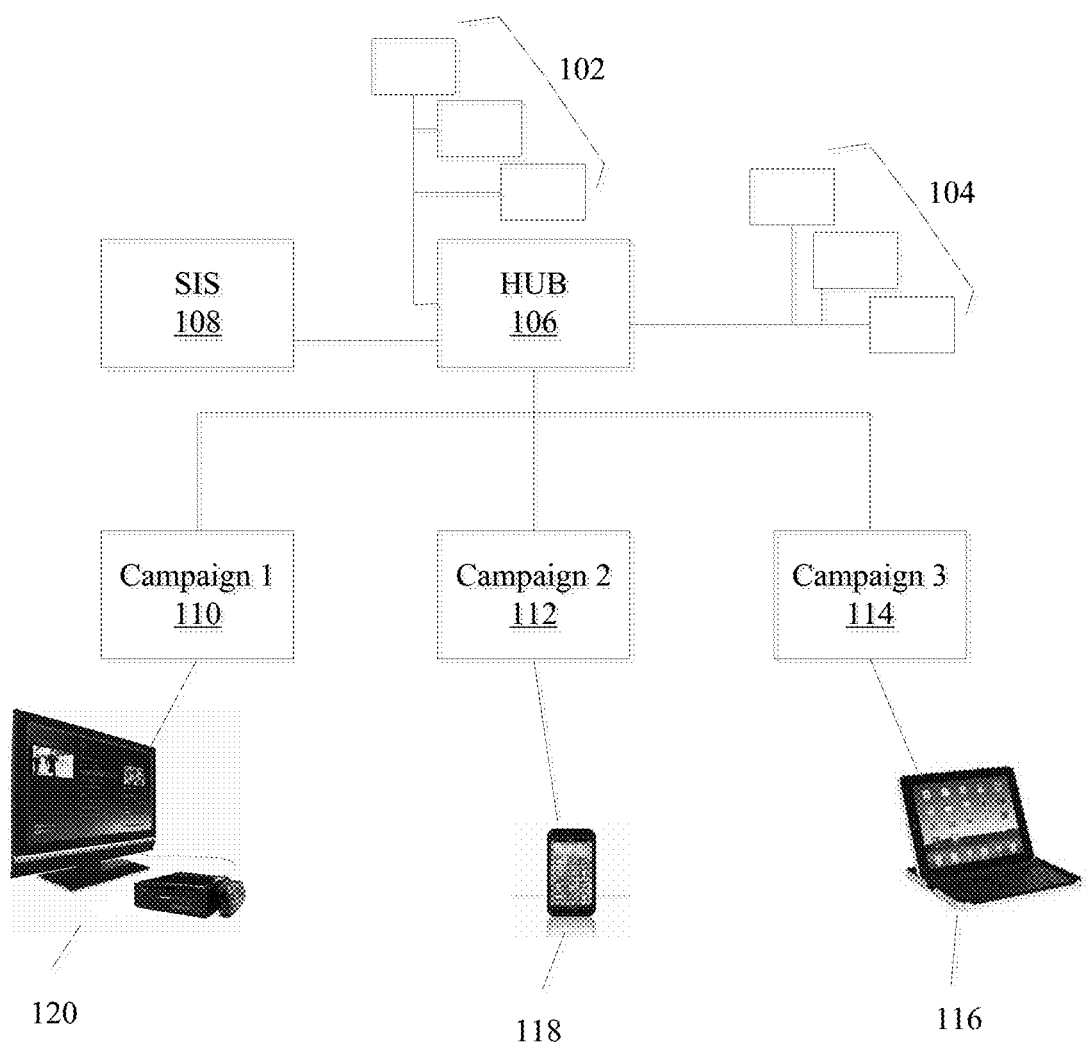
FIG. 1 illustrates a multi-platform frequency capping system embodiment.

Subscriber-initiated modifications to frequency capping parameters are described. For example, a subscriber download of a relevant coupon, or other expressions of intent to purchase a product or service, will cause an ad campaign modification for campaign lines or creative associated with the product or service.

Glossary

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

For the purpose of providing examples within detailed description "media" may refer to audio/video content, static graphic and interactive content, but the invention should not be considered limited to these forms of media.

The term "consumer" may refer to a person, machine or process which is capable of receiving media. For the purpose of providing examples within the detailed description consumer may refer to a person watching, listening or interacting with media, but the invention should not be considered limited to people.

'SIS' in this context refers to (Subscriber Information Service) a logic component in SCTE 130 compliant advanced digital advertising systems, that provides relevant subscriber information such as advertising focus refinement parameters.

'POIS' in this context refers to (Placement Opportunity Information Service) a logic component in SCTE 130 compliant advanced digital advertising systems, that supplies placement opportunity descriptions. The ADM, ADS, and/or the POIS may communicate with the SIS in order to obtain relevant subscriber information such as advertising focus refinement parameters and placement opportunity enablement.

'CIS' in this context refers to (Content Information Service) a logic component in SCTE 130 compliant advanced digital advertising systems, that provides content asset metadata and availability.

'ADM' in this context refers to (Ad Decision Manager) a logic component in SCTE 130 compliant advanced digital advertising systems, that originates messages articulating ad insertion opportunities (i.e., placement opportunities) with the primary communication consumer being the ADS (Ad Decision Service). The ADM completes the opportunity/decision lifecycle via reporting activity events (i.e., placement status). The ADM communicates placement opportunities and placement status to the ADS and the ADS returns placement decisions as a response to placement opportunities. An ADM may support multiple, simultaneously active ADS as each ADS may provide different placement decision services. The ADM block may consult the POIS for placement opportunity information with the POIS fronting an ad opportunity scheduling system (inventory system). Either or both the ADM and ADS may communicate with the CIS to obtain content asset metadata and ad asset availability information. The ADM, ADS, and/or the POIS may communicate with the SIS in order to obtain relevant subscriber information such as advertising focus refinement parameters and placement opportunity enablement.

'ADS' in this context refers to (Ad Decision Service) a logic component in SCTE 130 compliant advanced digital advertising systems, that determines how advertising content is combined with non-advertising (entertainment) content assets (i.e., placement decisions). The ADS may communicate with the POIS to acquire placement opportunity information. Either or both the ADM and ADS may communicate with the CIS to obtain content asset metadata and ad asset availability information. The ADM, ADS, and/or the POIS may communicate with the SIS in order to obtain relevant subscriber information such as advertising focus refinement parameters and placement opportunity enablement.

'Ad campaign' in this context refers to a set of advertising (ad) content around a product or service, and rules for one or more of how, when, and where to present the set of ad content 'ADS' in this context refers to (Ad Decision Service) a logic component in SCTE 130 compliant advanced digital advertising systems that determines how advertising content is combined with non-advertising (entertainment) content assets (i.e., placement decisions). The ADS may communicate with the POIS to acquire placement opportunity information. Either or both the ADM and ADS may communicate with the CIS to obtain content asset metadata and ad asset availability information. The ADM, ADS, and/or the POIS may communicate with the SIS in order to obtain relevant subscriber information, such as advertising focus refinement parameters and placement opportunity enablement.

'Ad campaign' in this context refers to a set of advertising (ad) content around a product or service, and rules for one or more of how, when, and where to present the set of ad content.

'Ad campaign manager' in this context refers to a logic component in SCTE 130 compliant advanced digital advertising systems, that provides the information necessary for the ADS to render ad decisions. An ADS may provide the same decision services or different services to multiple ADMs simultaneously. The placement execution cloud and/or the ADM block may consult the POIS for placement opportunity information with the POIS fronting the Inventory System cloud.

'Ad exposure' in this context refers to an event in which a viewer of program content is exposed to ad content.

'Ad impression' in this context refers to an impression (in the context of online advertising) that is a measure of the number of times an ad is displayed, whether it is clicked on or not. Each time an ad displays, it is counted as one impression. Because of the possibility of click fraud, robotic activity is usually filtered and excluded, and a more technical definition is given for accounting purposes by the IAB, a standards and watchdog industry group, "Impression" is a measurement of responses from a Web server to a page request from the user browser, which is filtered from robotic activity and error codes, and is recorded at a point as close as possible to opportunity to see the page by the user. Counting impressions is the method by which most Web advertising is accounted and paid for, and the cost is quoted in CPI (cost per impression). (Contrast CPC, which is click- and not impression-based.) A movement is underway to move from the current standard of served impressions, to a new standard of viewable impressions. The Interactive Advertising Bureau (IAB), Association of National Advertisers (ANA), and the American Association of Advertising Agencies (4A's) have joined forces in an initiative called 3MS (Making Measurement Make Sense), with the purpose of better defining the value of display media. Served impressions are the current standard. They are recorded by ad servers, and are counted whether or not the ad itself is fully loaded and in a space viewable to the end-user. Viewable impressions are defined as those that are at least 50% visible to the user for at least one second.

'Ad placement' in this context refers to a decision resulting from an ad placement opportunity which may include a content binding and a set of constraints for ad content inserted into or along-side program content.

'Ad placement opportunity' in this context refers to a potentially constrained location relative to digital content where ad insertion or content alterations may occur. The alterations may include insertions, replacements, or deletions of content in whole or in part. These locations, which contain the opportunity for content insertion, have traditionally been referred to as avails for linear video content. Ad placement opportunity refers to address and time locations where content may be placed, regardless of platform. Ad placement opportunity also refers to a time or location in or alongside program content into which an ad placement may be made.

'Ad placement system' in this context refers to a logic component in SCTE 130 compliant advanced digital advertising systems, that is responsible for opportunity determination and placement execution (e.g., content insertion/splicing). The ad placement system may consult the POIS for placement opportunity information with the POIS fronting an ad opportunity scheduling system (inventory system).

'MPEG-TS' in this context refers to (MPEG-TS, MTS or TS) a standard format for transmission and storage of audio, video, and Program and System Information Protocol (PSIP) data.[6] It is used in broadcast systems such as DVB, ATSC and IPTV. Transport Stream is specified in MPEG-2 Part 1, Systems (formally known as ISO/IEC standard 13818-1 or ITU-T Rec. H.222.0). Transport stream specifies a container format encapsulating packetized elementary streams, with error correction and stream synchronization features for maintaining transmission integrity when the signal is degraded. Transport streams differ from the similarly named program streams in several important ways: program streams are designed for reasonably reliable media, such as discs (like DVDs), while transport streams designed for less reliable transmission, namely terrestrial or satellite broadcast. Further, a transport stream may carry multiple programs.

'Program stream' in this context refers to part of a transport stream characterized by a Program Map Table (PMT) which has a unique PID, and the elementary streams associated with that program have PIDs listed in the PMT. For instance, a transport stream used in digital television might contain three programs, to represent three television channels. Suppose each channel consists of one video stream, one or two audio streams, and any necessary metadata. A receiver wishing to decode a particular "channel" merely has to decode the payloads of each PID associated with its program. It can discard the contents of all other PIDs. A transport stream with more than one program is referred to as MPTS—Multi Program Transport Stream. A single program transport stream is referred to as SPTS—Single Program Transport Stream.

'SCTE 130' in this context refers to a specification from the Society of Cable Telecommunication Engineers that defines a set of interfaces between logical components of an advanced advertising system designed to support linear, on demand and DVR delivery platforms, and to enable a more granular level of addressability. The interfaces address various elements of the advertising system including: ad manager, ad decision server, content information service, subscriber information service and placement opportunity information service.

'Stream server' in this context refers to logic that provides access to large content, such as long audio or video files, as a stream of bits that is to be rendered as it is received, creating the experience of real-time video or audio rendering at the client, but without the necessity of downloading all the content first.

'Web browser' in this context refers to logic for retrieving, presenting and traversing information resources on the World Wide Web. An information resource is identified by a Uniform Resource Identifier (URI) and may be a web page, image, video or other piece of content. Hyperlinks present in resources enable users easily to navigate their browsers to related resources. A web browser can also be defined as an application software or program designed to enable users to access, retrieve and view documents and other resources on the Internet. Generally, a web browser is application logic configured to access, retrieve, and display web pages.

'Web page' in this context refers to a file configured for access and display via a web browser over the Internet, or Internet-compatible networks.

'Ad exposure' in this context refers to an event in which a viewer of program content is exposed to ad content.

'WAN' in this context refers to a Wide Area Network, a wired network that provides data communications to a larger number of users than are usually served by a local area network (LAN) and is usually spread over a larger geographic area than that of a LAN.

'Subscriber' in this context refers to the ultimate user, i.e., customer, of a communications service.

'Ad campaign' in this context refers to a set of advertising (ad) content around a product or service, and rules for one or more of how, when, and where to present the set of ad content.

'Router' in this context refers to logic that distributes digital information that is contained within a data packet. Each data packet contains address information that a router can use to determine if the source and destination are on the same network, or if the data packet must be transferred from one network to another. This transfer to another type of network is achieved by encapsulating the data with network specific protocol header information. When multiple routers are used in a large collection of interconnected networks, the routers exchange information about target system addresses, so that each router can build up a table showing the preferred paths between any two systems on the interconnected networks.

'Hub' in this context refers to a device providing a common connection point for devices in a network. Hubs are commonly used to connect segments of a LAN. A hub contains multiple ports. When a packet arrives at one port, it is copied to the other ports so that all connected devices or segments of the LAN can see all packets. "Hub" may also refer to a component that coordinates communication between all of the system components. The hub may be stateless relative to the other components, or it may maintain an internal state independent of the state of the other components.

'RF' in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist.

'Memory' in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

'Display' in this context refers to an output device for visual information. Display technologies, especially for mobile devices, may include CSTN, TFT, TFD or OLED. There are also types of touchscreen displays, e.g., capacitive and resistive.

'Cable network' in this context refers to logic implementing a network that distributes television programs to subscribers via radio frequency (RF) signals transmitted through coaxial cables or light pulses through fiber-optic cables. FM radio programming, high-speed Internet, telephone service, and similar non-television services may also be provided through these cables.

'Firewall' in this context refers to logic that processes incoming and outgoing network traffic by analyzing the data packets and determining whether they should be allowed through or not, based on a rule set. A firewall establishes a barrier between a trusted, secure internal network and another network (e.g., the Internet) that is not assumed to be secure and trusted.

'Switch' in this context refers to logic that filters and forwards packets between network segments.

'VPN' in this context refers to logic extending a private network across a public network, such as the Internet, enabling a device to send and receive data across shared or public networks as if it were directly connected to the private network, while benefiting from the functionality, security and management policies of the private network. This is accomplished by establishing a virtual point-to-point connection through the use of dedicated connections, encryption, or a combination of the two.

'WAP' in this context refers to (wireless access point) a device that makes a wireless interface to a network available to client devices. Examples of wireless network access points are WiFi "hotspots" and 3G and 4G cellular hotspots.

'WiFi' in this context refers to (also spelled Wi-Fi) logic that allows an electronic device to exchange data or connect to the Internet wirelessly using radio waves. The term may refer to any logic that the Institute of Electrical and Electronics Engineers' (IEEE) 802.11 standards". The term "Wi-Fi" may thus be used as a synonym for "WLAN". A device comprising Wi-Fi (such as a personal computer, video-game console, smartphone, digital camera, tablet or digital audio player) can connect to a network resource such as the Internet via a wireless network access point. Hotspot coverage can comprise an area as small as a single room with walls that block radio waves or as large as many square miles this is achieved by using multiple overlapping access points.

'PC' in this context refers to (personal computer) a data processing and rendering device configured to be associated with one, or at most a small subset, of human users.

'Server' in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic or interacts with the server logic through a machine data network.

'Appliance' in this context refers to a network device designed and configured for a narrow purpose, typically involving access control or network security.

'Tablet' in this context refers to a data processing and rendering device characterized by a flat, portable form factor designed around a user interface based on contact with a display surface.

'Client' in this context refers to a device that utilizes the machine resources of another device, by signaling over a machine network interface.

'CPU' in this context refers to (Central Processing Unit)—an electronic circuit that operates as a main and general purpose execution component for device logic. CPU (Central Processing Unit)—otherwise known as a processor—is an electronic circuit that can execute computer programs.

'Flash memory' in this context refers to a type of electrically erasable programmable read-only memory (EEPROM), in which a section of memory cells can be erased in a single action or in a "flash." Flash memory is non-volatile computer memory that can be electrically erased and reprogrammed. Non-volatile means that no power is needed to maintain the information stored on the chip.

'LAN' in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

DETAILED DESCRIPTION OF EXEMPLARY EMBODIMENTS

A system is described in which ad campaigns are affected by measurable intent by subscribers to purchase a product or service. An impression-to-decision ratio is applied to frequency capping.

The frequency capping rules are transferred from a campaign management module to an ad decision service (ADS) module. The rules can include how to perform frequency capping for an entire campaign, campaign line items, and particular people, types of people, demographic, or graphical region constraints. Frequency capping may also be applied to a particular creative (piece of ad content).

In each case the frequency capping rules define under what circumstance a number of attempted ad impressions should be reduced (even to zero). The system is designed to systemically enable race conditions which may result in incorrect and imprecise counts of ad exposures or ad decisions during an interval of time. The system enables the level of imprecision to be tuned to particular advertisement circumstances. In a more general sense the system allows for tuning a level of permitting constancy on data managed by a SIS (Subscriber Information System) or, more generally, by any data storage component in the system.

Frequency capping may be controlled not by a number of impressions alone, but instead by a ratio of a number of impressions to a number of decisions for an associated campaign, campaign line, creative, or person or group. Furthermore, this ratio may be tuned and changed over time depending on the circumstances, creative, or the target audience. The ratio may be tuned based on the length of a creative. It may be tuned based on where the ad content is identified or inserted within the program or in a story board.

The frequency capping parameters may be modified by a user behavior that indicates an intension or inclination to make a purchase decision of a product that is the subject of an advertisement. For example, downloading a coupon for a particular product separately even from a program stream or presentation of an advertisement may be an event that is recorded and which affects subsequent frequency capping on advertisement for that products in unrelated media.

Another feature is frequency gapping, in which a frequency cap is specified, but also a frequency minimum is specified and in which a campaign is satisfied if a number of impressions falls within the frequency gap.

In one embodiment, ad request is received, and an ad decision is returned. A frequency cap value in memory for the ad (campaign line, etc.) is incremented upon returning the ad decision, before a corresponding ad impression indication is received. Upon receiving the corresponding PSN, a check is made as to whether the ad served. If it did, an impression is assumed, and nothing more is done as to the frequency cap value. If the ad didn't serve, the frequency count value in memory is decremented.

Frequency cap values are maintained over a rolling time interval. Examples of rolling time intervals (windows) are 2 impressions/decisions per 5 hours, and 3 impressions/decisions per day. A SIS stores necessary impression/decision timestamps in a compact format, for example as a compressed NVP. A compressed NVP format for the frequency cap values reduces message sizes, and data sizes in the SIS memory. New SIS data technology is described herein to handle higher write throughput and low latency data availability to implement frequency capping.

ADS rules include any frequency cap rules associated with campaign lines (or creatives). In order to reduce 'read load' on the SIS, the ADS only queries the SIS for impression/decision timestamps associated with eligible campaign lines having associated frequency cap values. The ADS evaluates impression/decision timestamps according to applicable frequency cap rules. The ADS marks as ineligible any campaign lines that have reached the frequency cap value. The ADS renders an ad decision based upon remaining, eligible campaign lines after elimination of ineligible lines. The ADS writes a decision timestamp associated with applicable campaign lines to the SIS. The Return Path Router writes impression timestamps associated with applicable campaign lines to the SIS.

FIG. 1 illustrates a multi-platform frequency capping system embodiment. Multiple independently operated campaign managers 110, 112, and 114, operate to deliver advertising to divergent device types (e.g., set top box 120, mobile phone 118, and laptop computer 116) over different delivery systems (cable, Internet, cellular network). The campaign managers 110, 112, and 114, are implemented as logic executing on device systems that interact with hub logic 106 that is operated independently from at least some of the campaign manager systems. The hub logic 106 provides communication and coordination with a plurality of ADS logic components 102 and a plurality of ADM logic components 104, and "centralized" (commonly utilized by the individual campaign managers on different content delivery systems) SIS logic 108 utilized by the hub logic 106. The system tracks and enforces frequency capping of ad exposure to individual content consumers, based not only on actual measured exposure, but on ad decisions across all of the campaign managers, whether or not those decisions lead to actual ad exposures.

Figure 2:
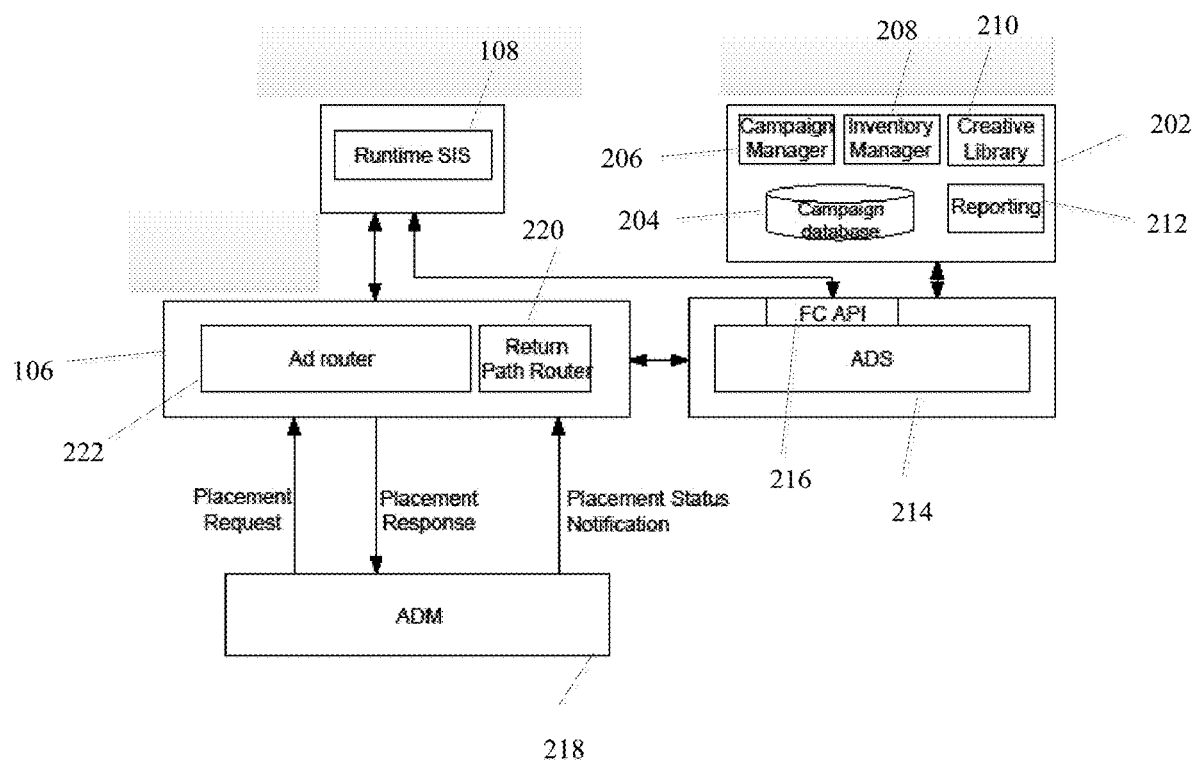
FIG. 2 illustrates a multi-platform frequency capping system embodiment.

FIG. 2 illustrates a multi-platform frequency capping system embodiment. An ad placement request is received at a hub component 106 from an ADM 218. The hub includes an ad router 222 (a component that determines which ADS will receive placement requests). The hub 106 communicates with the proper ADS 214 for the request, and the ADS 214 communicates with an ad server system 202 to identify an ad to fulfill the request. The ad server system 202 includes an ad campaign manager 206, an ad campaign database 204, a reporting module 212, a creative content library 210, and an ad inventory manager 208. The ADS includes a frequency capping API 216 which interacts with the SIS 108 to determine if the identified ad is already capped for the consumer that will be exposed to it.

To create a frequency cap value and associate it with a creative, campaign line, etc.

A frequency cap value for a campaign line (or creative, etc.) is created in the Campaign Manager 206.

The frequency cap value is passed, along with other ADS rules, to the ADS 214.

The ADS 214 caches the frequency cap value and associated rules.

To update a frequency cap value:

FC for a Campaign Line (or Creative) is updated in the Campaign Manager 206.

The updated FC is passed, along with other ADS rules, to the ADS 214.

The ADS 214 caches updated FC information.

Non-Runtime Operation: Deleting a Frequency Cap

FC for a Campaign (or Creative) is deleted in the Campaign Manager 206 (or it expires along with the Campaign Line).

FC deletion notice is passed, along with other ADS rules, to the ADS 214.

The ADS 214 queries the SIS 108 to identify all subscriber/device IDs maintaining Decision (and Impression) Counters associated with the FC.

The ADS 214 deletes from the SIS 108 the Decision (and Impression) Counters associated with the FC for all of the returned subscriber/device IDs.

The ADS 214 deletes the FC from its own cache.

Runtime Operation: Processing a Placement Request and Decision

ADM 218 sends a Placement Request, containing the subscriber/device ID, to the Ad Router 222.

Ad Router 222 retrieves Targeting Properties for the subscriber/device from the SIS 108, based on the subscriber/device ID.

Ad Router 222 sends the Ad Request to the ADS 214.

Based on the current decision rules, the ADS 214 constructs a candidate list of the Campaign Lines applicable to the Ad Decision.

Evaluating the candidate list, the ADS 214 identifies whether any of the applicable Campaign Lines are subject to an FC.

For each applicable Campaign Line that is subject to an FC, the ADS 214 queries the SIS 108 to determine the values of the Decision (and Impression) Counters associated with the FC.

The SIS 108 returns the relevant Counter and the ADS 214 compares the Counter against its corresponding FC, eliminating the applicable Campaign Line if the FC has been reached.

Upon determining an applicable Campaign Line for which no FC exists or for which the FC has not been reached, and upon applying other exclusion rules and prioritization, the ADS 214 returns to the Ad Router the appropriate Ad Response.

The Ad Router, in turn, issues a Placement Response back to the ADM 218.

In the case of an FC that has not been reached, the FC Engine queries the SIS 108 to increment the applicable Decision Counter.

Processing an Impression

The ADM 218 sends a Placement Status Notification with impression data back to the Return Path Router 220.

The Return Path Router 220 evaluates the impression data to determine if the impression was associated with a Campaign Line (or Creative) for which an FC exists.

If an FC indeed exists, the Return Path Router 220 queries the SIS 108 to update the applicable Impression Counter.

Runtime Operation: Processing a Placement Request (3rd Party ADS)

For each applicable Campaign Line that is subject to an FC, the ADS 214 queries the SIS 108 via the FC API to determine the values of the Decision (and Impression) Counters associated with the FC.

The SIS 108 returns via the FC API the relevant Counter and the ADS 214 compares the Counter against its corresponding FC, eliminating the applicable Campaign Line if the FC has been reached.

Upon determining an applicable Campaign Line for which no FC exists or for which the FC has not been reached, and upon applying other exclusion rules and prioritization, the ADS 214 returns to the Ad Router 222 the appropriate Ad Response.

Capping impressions is desirable, but it can take time to collect impression data from video delivery system. Capping decisions is quickest, but an ad placed is not necessarily an ad viewed, because subscribers my skip the ad or not watch the entire program. One embodiment of the system caps on decisions initially, but then, as impressions are collected, applies the ratio of impressions to decisions (possibly for a preceding, applicable period of time, either across a single subscriber device or all devices on the same account or across devices subject to different weightings) to adjust the cap.

One approach taken by some implementations is to apply the ratio as a probability multiplier. For example, if only 60% of the decisions yield an impression, increment the counter 60% of the time. (e.g., use a uniform random number generator and select <=60%).

Subscribers may affect the frequency cap themselves, based upon expressed intent to purchase an advertised product or service. For example, by downloading a coupon for a product, a subscriber might lower the frequency cap for the product or for ads for the product or related products, and thus received ads for the product (or fewer ads, period). Purchase intent data might come from other sources, such as browsed or searched product information. Purchase intent data may be applied to show more ads for a product under other circumstances. Purchase intent data could be used to show less of one type of ad but more of another type of ad. In these embodiments the system may not only capture impression data from the ADM, but also collect 'purchase intent data' from the ADM. The 'purchase intent data' may be used to increment the counter against the frequency cap. For example, downloading a coupon might be construed to count as viewing ten impressions, or achieving the impression cap for the next week.

In one embodiment, a centralized SIS for multiple ad platforms, such as cable, online (download via the Internet), and broadcast is utilized for multiplatform ad frequency capping. One unexpected emergent property of centralizing at the SIS is that frequency capping may be based on ad decisions and impressions both, cross platform (including devices that don't record cookies, such as some mobile phone or set top boxes). One implementation utilizes a set of linked counters where each node of the linked structure is time stamped, branded, tagged with a device id, and perhaps presentation/length of exposure or interactivity with ad information.

Figure 3:
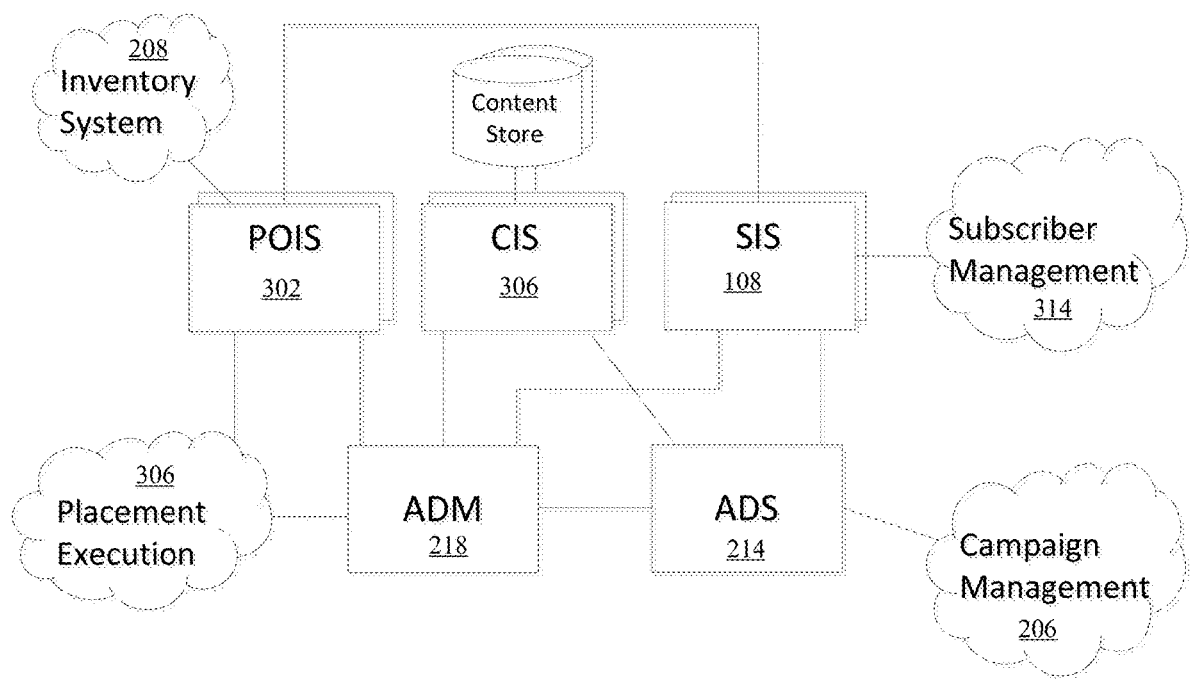
FIG. 3 illustrates an embodiment of a frequency capping machine system.

FIG. 3 illustrates an embodiment of a frequency capping machine system. The system comprises an inventory management component 208, placement execution component 306, campaign management component 206, subscriber management component 314, content storage 304, and a POIS 302, CIS 306, SIS 108, ADM 218, and ADS 214. The system may operate to carry out the various processes for frequency capping etc. described in conjunction with FIG. 2.

Figure 4:
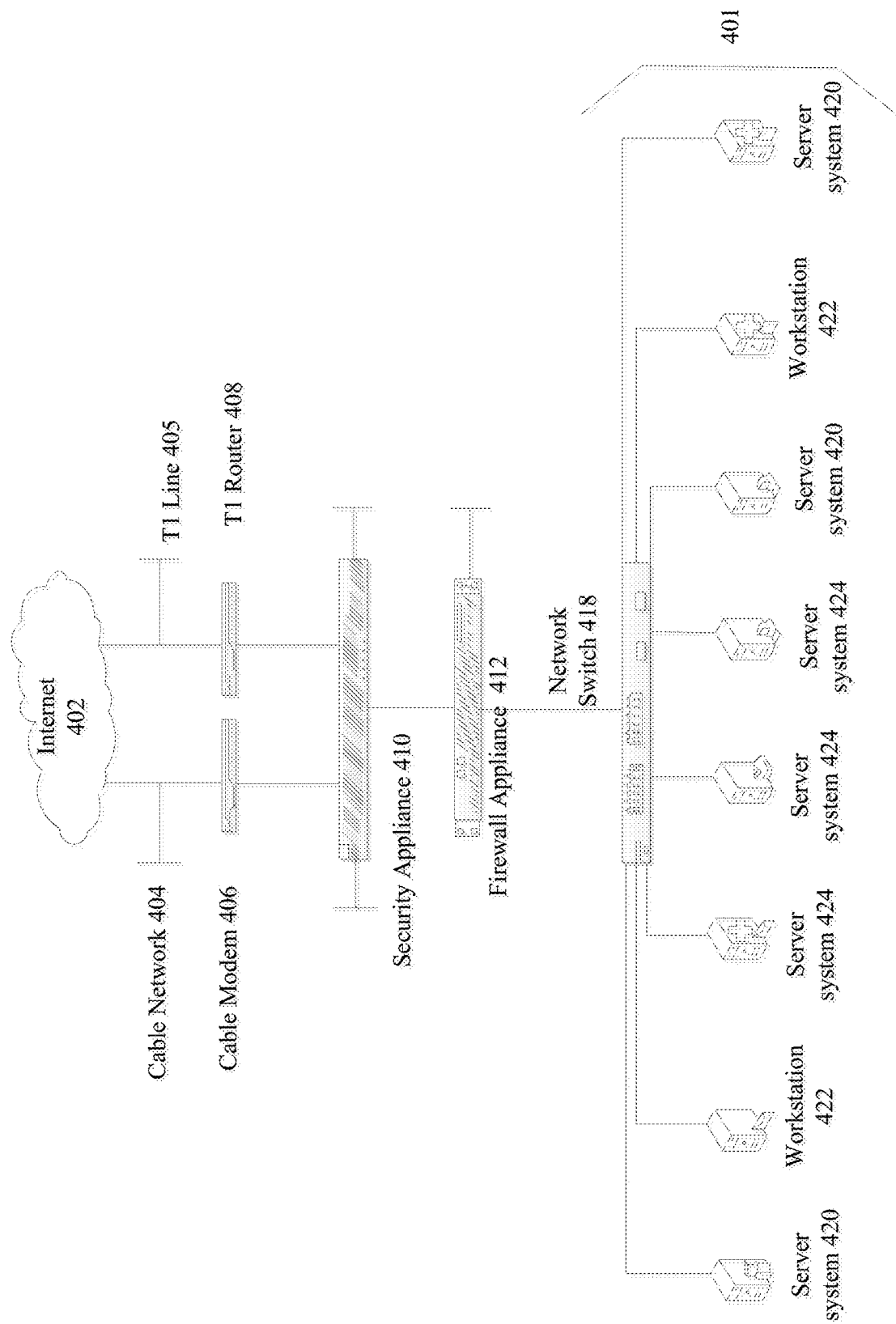
FIG. 4 illustrates an embodiment of a machine internetworking system to implement aspects of the described systems and processes.

FIG. 4 illustrates an embodiment of a machine internetworking system to implement aspects of the described systems and processes. Communication is carried out between devices of a local area network (LAN) 401 and a wide area network (WAN) 402 (e.g., the Internet). The LAN 401 includes server systems 420, server systems 424, and workstations 422, among other devices. Of course, a typical LAN includes other devices as well, such as printers, faxes, scanners, etc. The networks are bridged over a cable network 404 and a T1 line 405 via a system of devices including (in this example) a cable modem 406, a T1 Router 408, a security appliance 410, a firewall appliance 412, and a network switch 418. The security appliance 410 (e.g., Cisco 5510) provides, for example, firewall and VPN (virtual private network) concentration, intrusion detection, and intrusion prevention. The firewall appliance 412 (e.g., Barracuda) provides, for example, anti-virus and anti-fishing protection for the LAN 401, and web, email, and file content filtering. Communication traffic is switched between the LAN 401 and the WAN 402 by a network switch 418.

Figure 5:
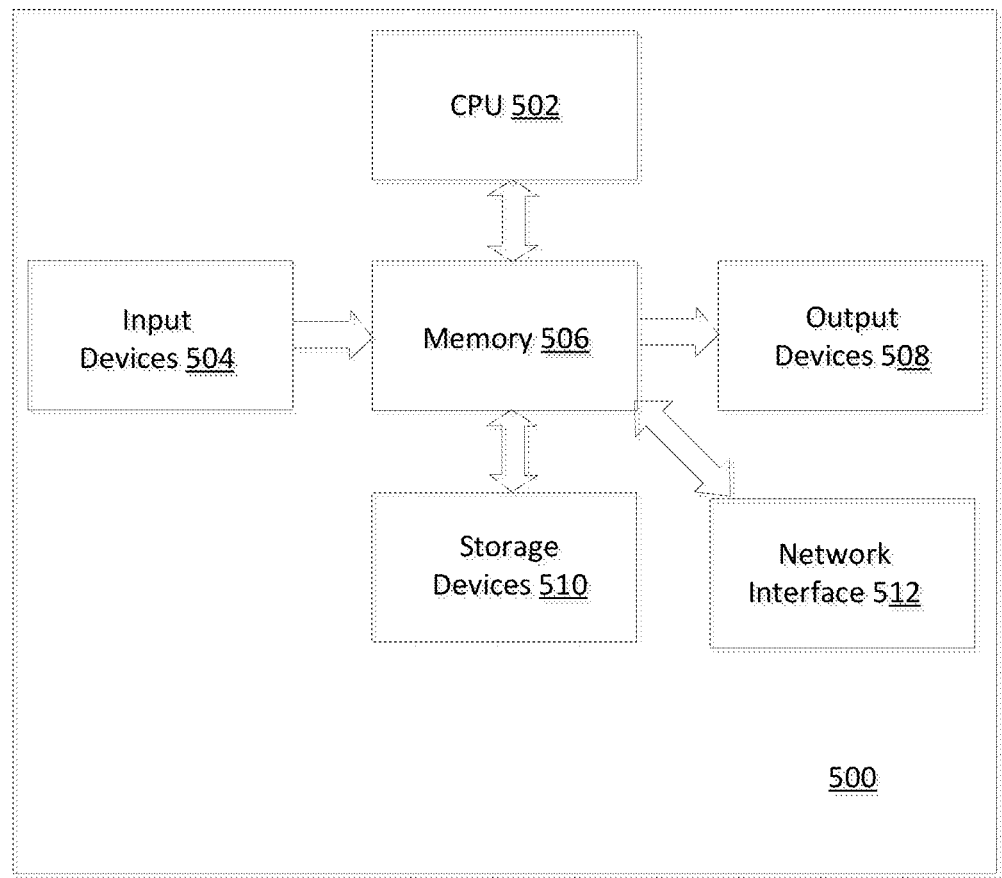
FIG. 5 illustrates a machine which can implement one or more of the components described herein.

FIG. 5 illustrates a machine which can implement one or more of the components described herein (e.g., in FIG. 1, 2, 3, or 4). Input devices 504 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 504 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 504 are provided via various machine signal conductors (e.g., busses or network interfaces) and circuits to memory devices 506. The memory devices 506 is typically what is known as a first or second level memory device, providing for storage (via configuration of matter or states of matter) of signals received from the input devices 504, instructions and information for controlling operation of the CPU 502, and signals from storage devices 530. Information stored in the memory devices 506 is typically directly accessible to processing logic 502 of the device. Signals input to the device cause the reconfiguration of the internal material/energy state of the memory device 506, creating in essence a new machine configuration, influencing the behavior of the device 500 by affecting the behavior of the CPU 502 with control signals (instructions) and data provided in conjunction with the control signals. Second or third level storage devices 530 may provide a slower but higher capacity machine memory capability. Examples of storage devices 530 are hard disks, optical disks, large capacity flash memories or other non-volatile memory technologies, and magnetic memories. The processing logic 502 may cause the configuration of the memory 506 to be altered by signals in storage devices 530. In other words, the CPU 502 may cause data and instructions to be read from storage devices 530 in the memory 506 from which may then influence the operations of CPU 502 as instructions and data signals, and from which it may also be provided to the output devices 508. The CPU 502 may alter the content of the memory of 506 by signaling to a machine interface of memory 506 to alter the internal configuration, and then converted signals to the storage devices 530 to alter its material internal configuration. In other words, data and instructions may be backed up from memory 506, which is often volatile, to storage devices 530, which are often non-volatile. Output devices 508 are transducers which convert signals received from the memory 506 into physical phenomenon such as vibrations in the air, or patterns of light on a machine display, or vibrations (i.e., haptic devices) or patterns of ink or other materials (i.e., printers and 3-D printers). Communication interface 512 receives signals from the memory 506 and converts them into electrical, optical, or wireless signals to other machines, typically via a machine network, for example via one such as the embodiments illustrated in FIG. 1, 2, 3, or 4. Communication interface 512 also receives signals from the machine network and converts them into electrical, optical, or wireless signals to the memory 506.

Figure 6:
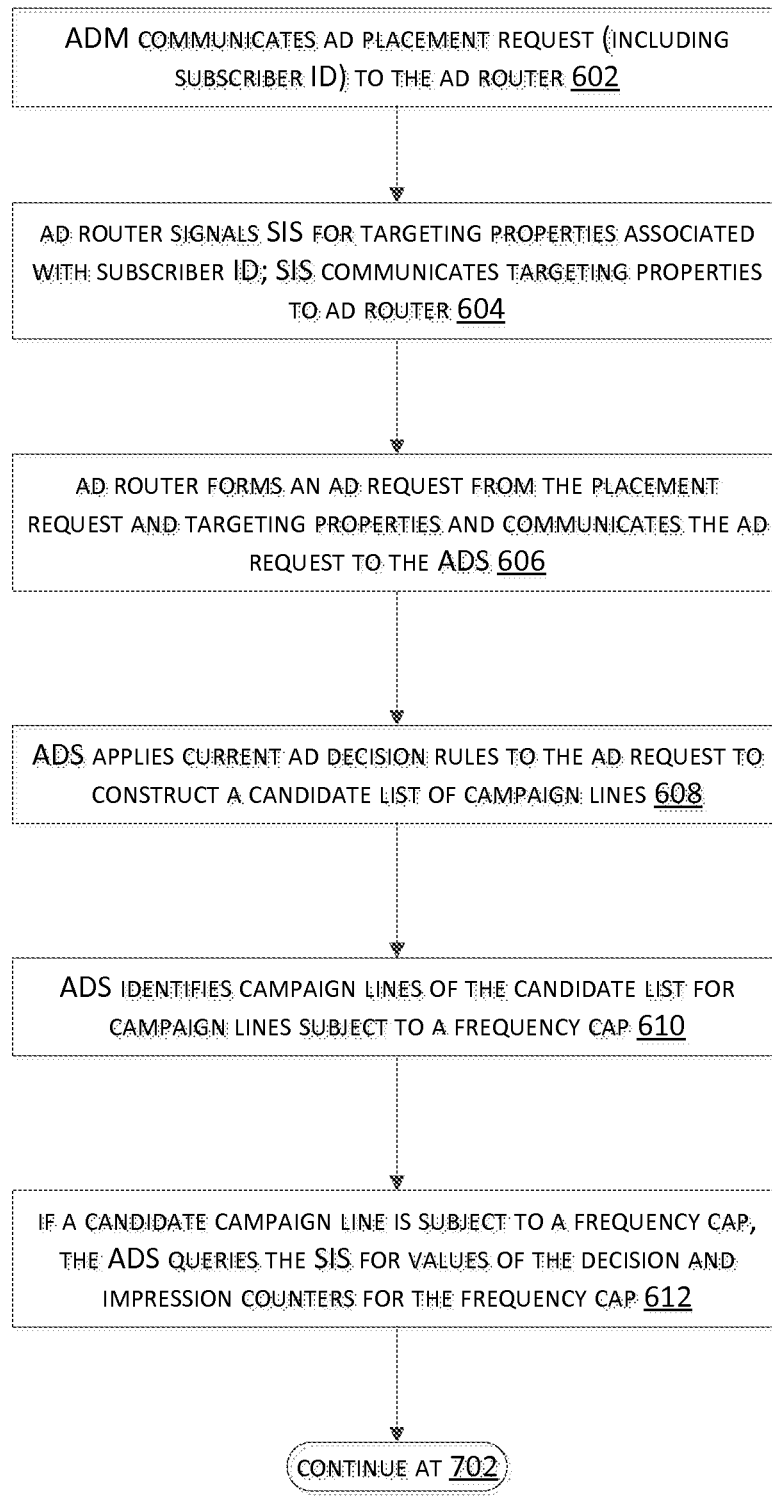
FIG. 6-7 is a flow chart of an embodiment of a frequency capping process.
Figure 7:
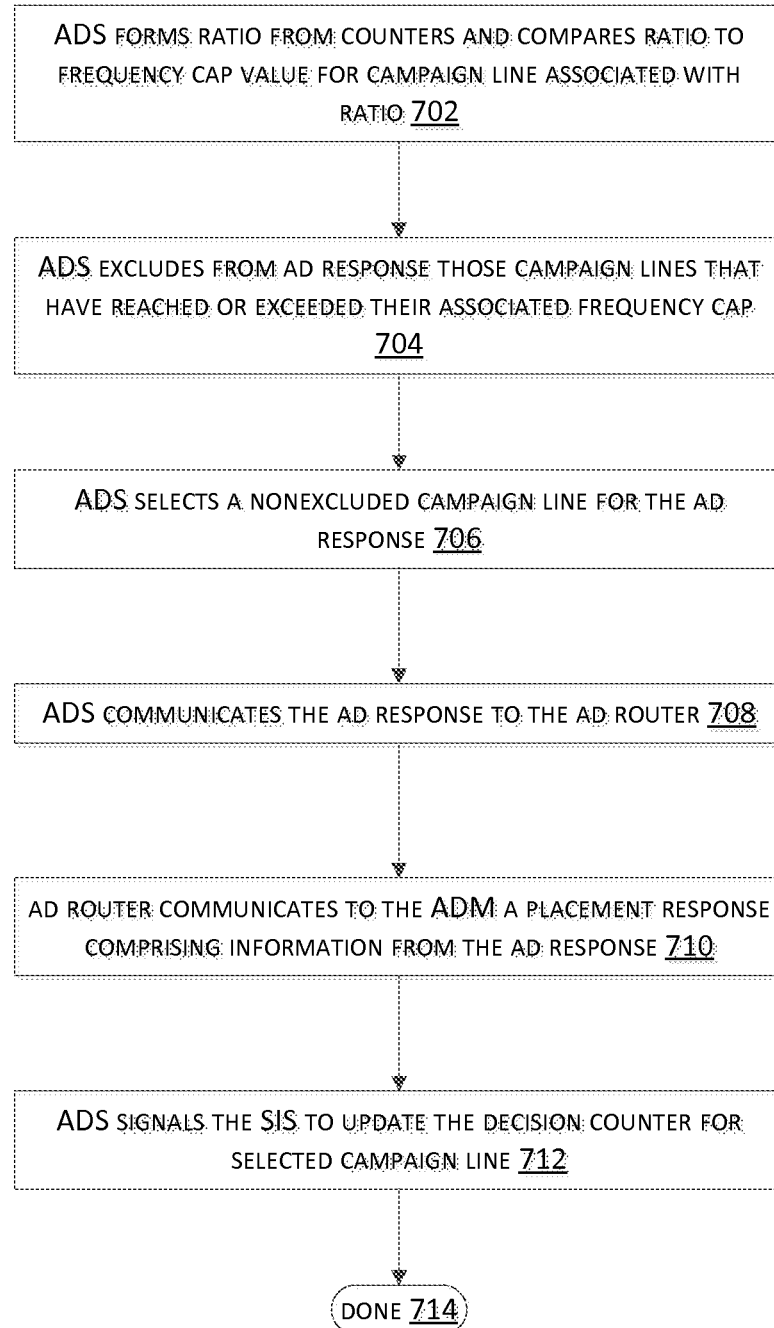

FIG. 6-7 is a flow chart of an embodiment of a frequency capping process. The ADM (e.g., a "third party" ADM that is not co-owned with the frequency capping system) communicates an ad placement request to the ad router 602. The ad router signals the SIS for targeting properties associated with the provided subscriber ID. The SIS communicates these targeting properties to the ad router 604. The ad router forms an ad request from the placement request and targeting properties and communicates the ad request to the ADS 606. The ADS applies current ad decision rules to the ad request to construct a candidate list of campaign lines 608. The ADS identifies campaign lines of the candidate list for campaign lines subject to a frequency cap 610. If a candidate campaign line is subject to a frequency cap, the ADS queries the SIS for values of the decision and impression counters for the frequency cap 612. The ADS forms a ratio from the counters and compares the ratio to a frequency cap value for the campaign line associated with the ratio 702. The ADS excludes from the ad response those campaign lines that have reached or exceeded their associated frequency cap 704. The ADS selects a nonexcluded campaign line for the ad response 706. The ADS communicates the ad response to the ad router 708. The ad router communicates to the ADM a placement response comprising information from the ad response 710. The ADS signals the SIS to update the decision counter for the selected campaign line 712.

Figure 8:
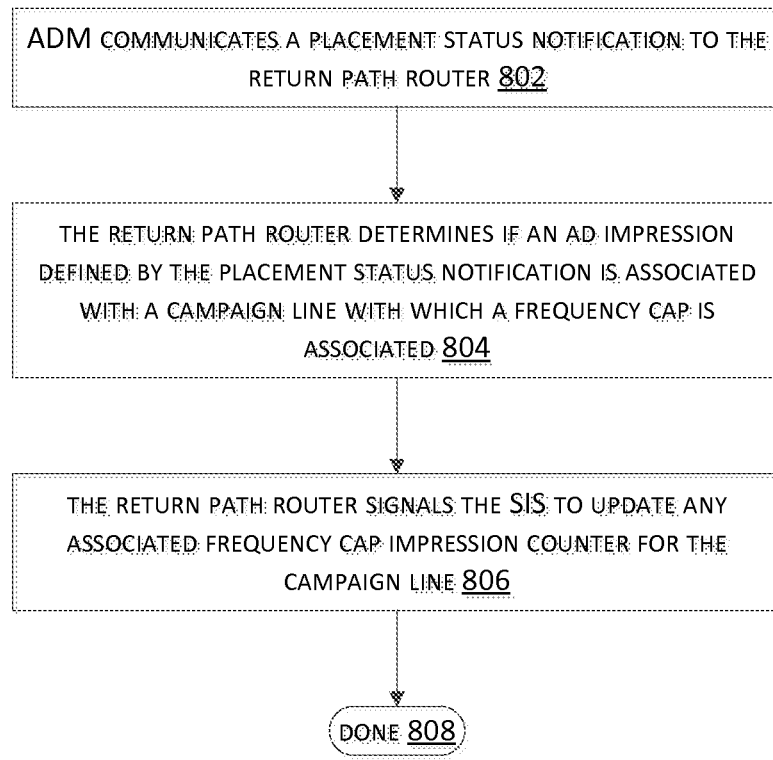
FIG. 8 is a flow chart of an embodiment of processing an ad impression for frequency capping.

FIG. 8 is a flow chart of an embodiment of processing an ad impression for frequency capping. The ADM communicates a placement status notification to the return path router 802. The return path router determines if an ad impression defined by the placement status notification is associated with a campaign line with which a frequency cap is associated 804. The return path router signals the SIS to update any associated frequency cap impression counter for the campaign line 806.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The invention claimed is:

1. A system comprising:
a plurality of digital ads;
a subscriber information service (SIS) component;
an advertising decision service (ADS) component to select one of the digital ads in response to signals from a digital content server communicating digital content to a plurality of end user devices over at least one digital network, wherein for the ADS to select one of the digital ads is referred to as an 'ad decision';
a return path router for signals from the end user devices;
the SIS comprising logic to form a first counter to count the ad decisions for each of the digital ads in a time period;
the first counter determined by timestamps written by the ADS to the SIS in response to ad decisions for the time period; the SIS comprising logic to form a second counter to count a number of times each of the digital ads is displayed on the end user, devices in the time period, wherein a display of a particular digital ad of the digital ads by the user devices is an 'ad impression' for the particular digital ad;

the second counter determined by timestamps written by the return path router to the SIS in response to an impression signals generated by the end user devices for the time period;

the ADS comprising logic to query the SIS for the first counter and the second counter and to compute a ratio of the first counter and the second counter for each of the digital ads; and the ADS comprising logic to apply the ratio to control frequency capping of the digital ads to the end user devices.

2. The system of claim 1, further comprising: a campaign management module; logic to communicate configured frequency capping parameters from the campaign management module to the ADS; and the ADS comprising logic to control the frequency capping of the digital ads based on applying the parameters to the ratio.

3. The system of claim 2, wherein the parameters comprise frequency capping constraint settings for one or more of an entire ad campaign, campaign line items, particular people, types of people, demographics, or graphical regions.

4. The system of claim 2, wherein the frequency capping is applied to a particular creative.

5. The system of claim 1, further comprising: logic to systemically enable race conditions to generate imprecise values of the second counter or the first counter during the time period.

6. The system of claim 5, further comprising: logic to tune the race conditions to set a level of imprecision of one or both of the first counter and the second counter.

7. The system of claim L wherein the ratio is varied for each of the digital ads based on a length of each of the digital ads.

8. The system of claim 1, wherein the ratio for each of the digital ads is varied based on at what point in the digital content each of the digital ads is presented on the end user devices.

9. The system of claim 1, further comprising: logic to adjust the ratio in response to a download performed on an end user device.

10. The system of claim 9 wherein the download is performed independently from a program stream of the digital content or a presentation of a particular one of the digital ads on the end user device.

11. The system of claim 1, further comprising: logic to perform frequency gapping, in which a frequency cap value is, configured to compare with the ratio, but also a exposure frequency minimum is configured for a impressions for one or more of the digital ads.

12. The system of claim 1, further comprising: logic to cause, upon receiving the ad decision, the first counter to increment a and to cause the ADS to adjust the, ratio with the incremented first counter before an ad impression corresponding to the ad decision is received.

13. The system of claim 12, further comprising: logic to decrement the, first counter and to cause the ADS to adjust the ratio with the decremented first counter on condition of a of failure to receive, from the, return path router, a placement status notification corresponding to the ad decision.

14. A system comprising:
a subscriber information service (SIS) component;
an advertising decision service (ADS) components to select first digital content for display on an end user device in response to signals from a digital content server communicating second digital content to the end user device over a digital network, wherein selection of the first digital content by the content selector is a 'decision';
a return path router for routing signals received from the end user device in response to impressions of the first digital content on the end user device, wherein display of the first content on the end user device is an'impression';
logic to:
operate the an advertising decision service (ADS) components to write timestamps to the SIS in response to decisions;
operate the SIS to form a first counter of decisions for the first content with timestamps that fall within a time period;
operate the SIS to form a second counter of impressions for the first content with timestamps that fall within the time period;
operate the an advertising decision service (ADS) components to query the SIS for the first counter and the second counter and to compute a ratio of the first counter and the second counter for the first content in the time period;
and apply the ratio to cap a frequency of display of the first content on the end user devices in the time period.

15. The system of claim 14, further comprising: a random number generator to generate a value; and the content selector configured to generate the decision based on both of the ratio and the value generated by the random number generator.

16. The system of claim 14, further comprising: at an initial time, controlling the frequency of display of the first content based solely on the first count; and after an interval of time following the initial time, applying the ratio to control the frequency of display of the first content.

* * * * *